(12) United States Patent
Allen

(10) Patent No.: US 11,382,287 B2
(45) Date of Patent: Jul. 12, 2022

(54) AUTOMATED PLANT POT ASSEMBLY

(71) Applicant: Vaughn Allen, Las Vegas, NV (US)

(72) Inventor: Vaughn Allen, Las Vegas, NV (US)

( * ) Notice: Subject to any disclaimer, the term of this patent is extended or adjusted under 35 U.S.C. 154(b) by 59 days.

(21) Appl. No.: 17/035,964

(22) Filed: Sep. 29, 2020

(65) Prior Publication Data
US 2022/0095558 A1 Mar. 31, 2022

(51) Int. Cl.
*A01G 27/00* (2006.01)
*A01G 27/02* (2006.01)

(52) U.S. Cl.
CPC ........... *A01G 27/003* (2013.01); *A01G 27/02* (2013.01)

(58) Field of Classification Search
CPC .... A01G 9/028; A01G 27/001; A01G 27/003; A01G 27/005; A01G 27/02; A01G 27/06
USPC ..................................... 47/66.1, 79, 48.5, 75
See application file for complete search history.

(56) References Cited

U.S. PATENT DOCUMENTS

| | | | | |
|---|---|---|---|---|
| 2,228,892 A * | 1/1941 | Hugo | ..................... | A01G 27/00 47/79 |
| 2,638,716 A * | 5/1953 | Luipersbek | ............ | A01G 27/04 47/79 |
| 3,079,037 A * | 2/1963 | Schechter | ............ | B65D 43/021 220/212 |
| 4,142,324 A * | 3/1979 | Magyar, Jr. | ............ | A01G 9/029 47/75 |
| 4,171,593 A * | 10/1979 | Bigglestone | ........... | A01G 27/04 47/79 |
| 4,291,493 A * | 9/1981 | Monson | ................. | A01G 31/02 47/14 |
| 4,336,666 A * | 6/1982 | Caso | .................... | A01G 27/006 47/48.5 |
| 5,315,787 A * | 5/1994 | Schleicher | ........... | A01G 27/003 222/66 |
| 5,341,596 A * | 8/1994 | Kao | ....................... | A01G 27/04 47/71 |
| 5,385,590 A * | 1/1995 | Sledge | ................. | A01G 27/001 47/62 R |
| 5,749,170 A | 5/1998 | Furuta | | |
| 5,826,374 A * | 10/1998 | Baca | ..................... | A01G 31/02 47/62 E |
| 6,070,359 A * | 6/2000 | Liu | ........................ | A01G 27/02 47/48.5 |

(Continued)

FOREIGN PATENT DOCUMENTS

CN 108522235 A * 9/2018
CN 111657003 A * 9/2020
(Continued)

OTHER PUBLICATIONS

English-language translation of DE 202004012375 U1 (Year: 2004).*
English-language translation of KR 20150042513 A (Year: 2015).*

*Primary Examiner* — Lisa L Tsang (57) ABSTRACT

An automated plant pot assembly includes a first pot for containing an aqueous solution. A second pot is provided for having a plant potted therein and the second pot is insertable into the first pot. A spray bar is removably positionable in the second pot and the spray bar has a plurality of spray ports each fluidly integrated therein. A pumping unit is integrated into the first pot to pump the aqueous solution in the first pot. The pumping unit is placed in fluid communication with the spray bar when the second pot is positioned in the first pot to spray the aqueous solution onto the plant that is potted in the second pot.

9 Claims, 6 Drawing Sheets

(56) References Cited

U.S. PATENT DOCUMENTS

| | | | |
|---|---|---|---|
| 6,345,470 B1 | 2/2002 | Slaght | |
| 6,421,959 B1 * | 7/2002 | Van Laere | A01G 27/02 47/79 |
| 6,584,730 B1 * | 7/2003 | Mai | A01G 27/02 47/48.5 |
| 7,110,862 B2 * | 9/2006 | Park | A01G 25/167 340/604 |
| 7,222,454 B1 * | 5/2007 | Chen | A01G 27/003 47/48.5 |
| 7,607,257 B2 | 10/2009 | Goldberg | |
| 8,065,834 B2 * | 11/2011 | Eckert | A01G 27/02 47/66.1 |
| 8,408,229 B2 * | 4/2013 | Goldberg | A01G 27/001 137/78.3 |
| 9,113,606 B2 * | 8/2015 | Gardner | A01G 31/00 |
| 10,104,844 B2 * | 10/2018 | Caceres | A01G 27/001 |
| 2002/0088177 A1 | 7/2002 | Gergek | |
| 2005/0132646 A1 * | 6/2005 | Littge | B05B 1/207 47/79 |
| 2006/0016126 A1 * | 1/2006 | Brorson | A01G 9/028 47/86 |
| 2009/0293354 A1 * | 12/2009 | Goldberg | A01G 25/167 47/66.6 |
| 2013/0205662 A1 * | 8/2013 | Yancey | A01G 27/02 47/66.6 |
| 2014/0298719 A1 | 10/2014 | Mackin | |
| 2016/0345517 A1 * | 12/2016 | Cohen | A01G 7/045 |
| 2018/0070544 A1 * | 3/2018 | Campbell | A01G 27/001 |
| 2020/0163295 A1 * | 5/2020 | Mata | A01G 27/005 |

FOREIGN PATENT DOCUMENTS

| | | | | |
|---|---|---|---|---|
| DE | 202004012375 U1 * | 10/2004 | | A01G 27/003 |
| DE | 102014209930 B3 * | 9/2015 | | A01G 27/02 |
| DE | 202019104581 U1 * | 9/2019 | | A01G 27/02 |
| EP | 1332666 A1 * | 8/2003 | | A01G 9/02 |
| KR | 20130089048 A * | 8/2013 | | |
| KR | 20150042513 A * | 4/2015 | | |
| WO | WO-8706095 A2 * | 10/1987 | | A01G 27/04 |

* cited by examiner

AUTOMATED PLANT POT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to automated pot devices and more particularly pertains to a new automated pot device for automatically watering a plant in a plant pot.

(2) Description of Related Art Including Information Disclosed Under 37 CFR 1.97 and 1.98

The prior art relates to automated pot devices including a variety of automatic plant watering pots that include a first pot for holding water, a second pot for holding a plant that is positionable in the first pot and a pumping unit that pumps water into the second pot. In each instance an electric fluid pump is claimed as the means of pumping the water.

BRIEF SUMMARY OF THE INVENTION

An embodiment of the disclosure meets the needs presented above by generally comprising a first pot for containing an aqueous solution. A second pot is provided for having a plant potted therein and the second pot is insertable into the first pot. A spray bar is removably positionable in the second pot and the spray bar has a plurality of spray ports each fluidly integrated therein. A pumping unit is integrated into the first pot to pump the aqueous solution in the first pot. The pumping unit is placed in fluid communication with the spray bar when the second pot is positioned in the first pot to spray the aqueous solution onto the plant that is potted in the second pot.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
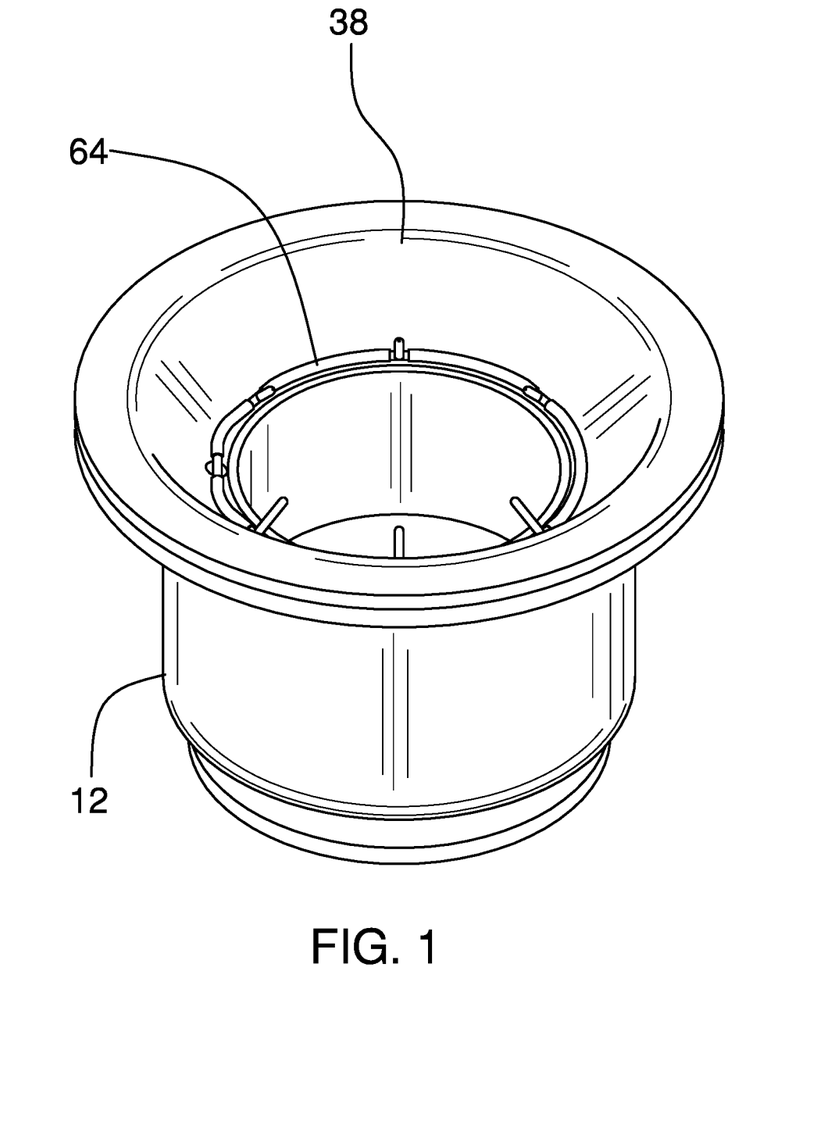
FIG. 1 is a perspective view of an automated plant pot assembly according to an embodiment of the disclosure.
Figure 2:
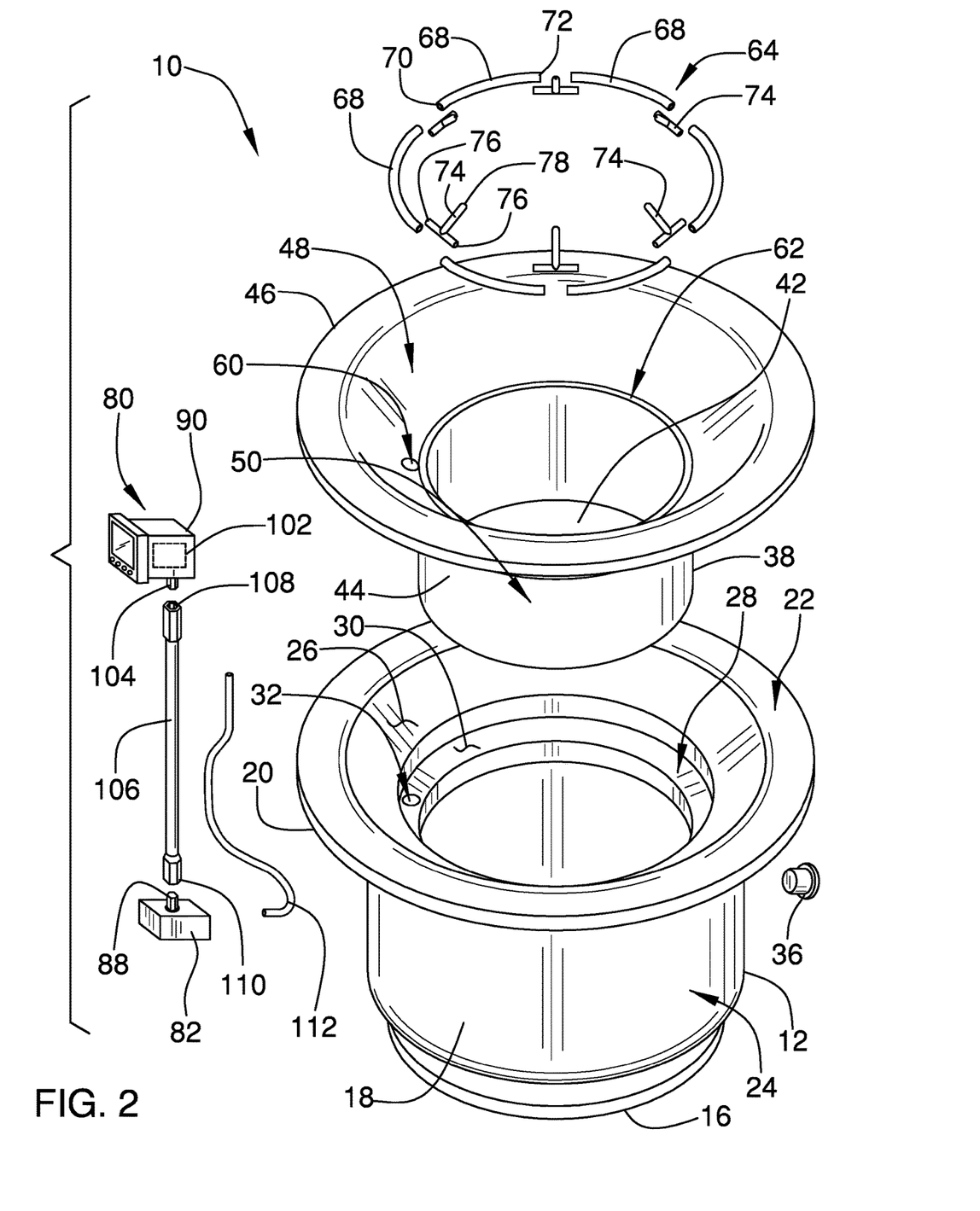
FIG. 2 is an exploded perspective view of an embodiment of the disclosure.
Figure 3:
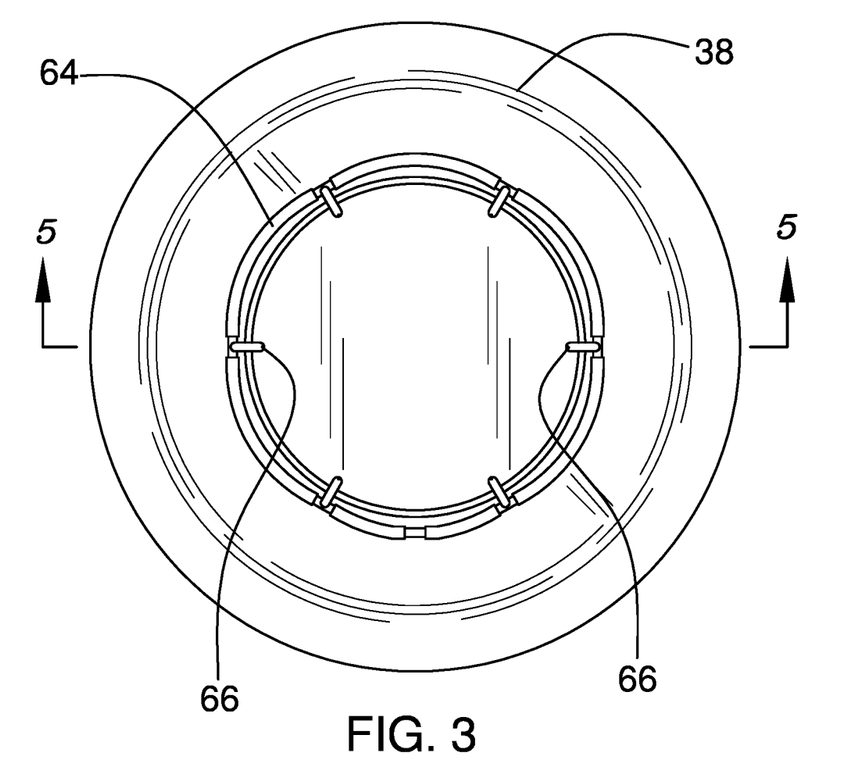
FIG. 3 is a top view of an embodiment of the disclosure.
Figure 4:
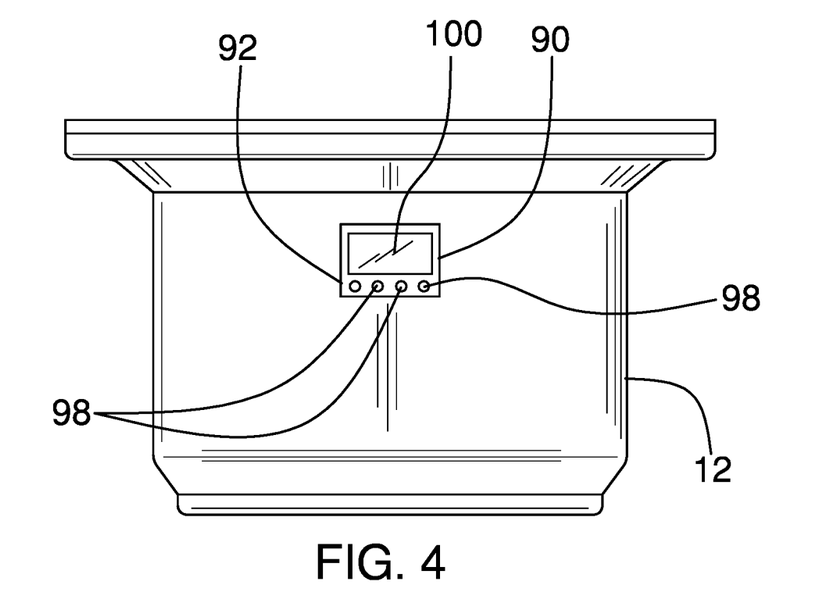
FIG. 4 is a front view of an embodiment of the disclosure.
Figure 5:
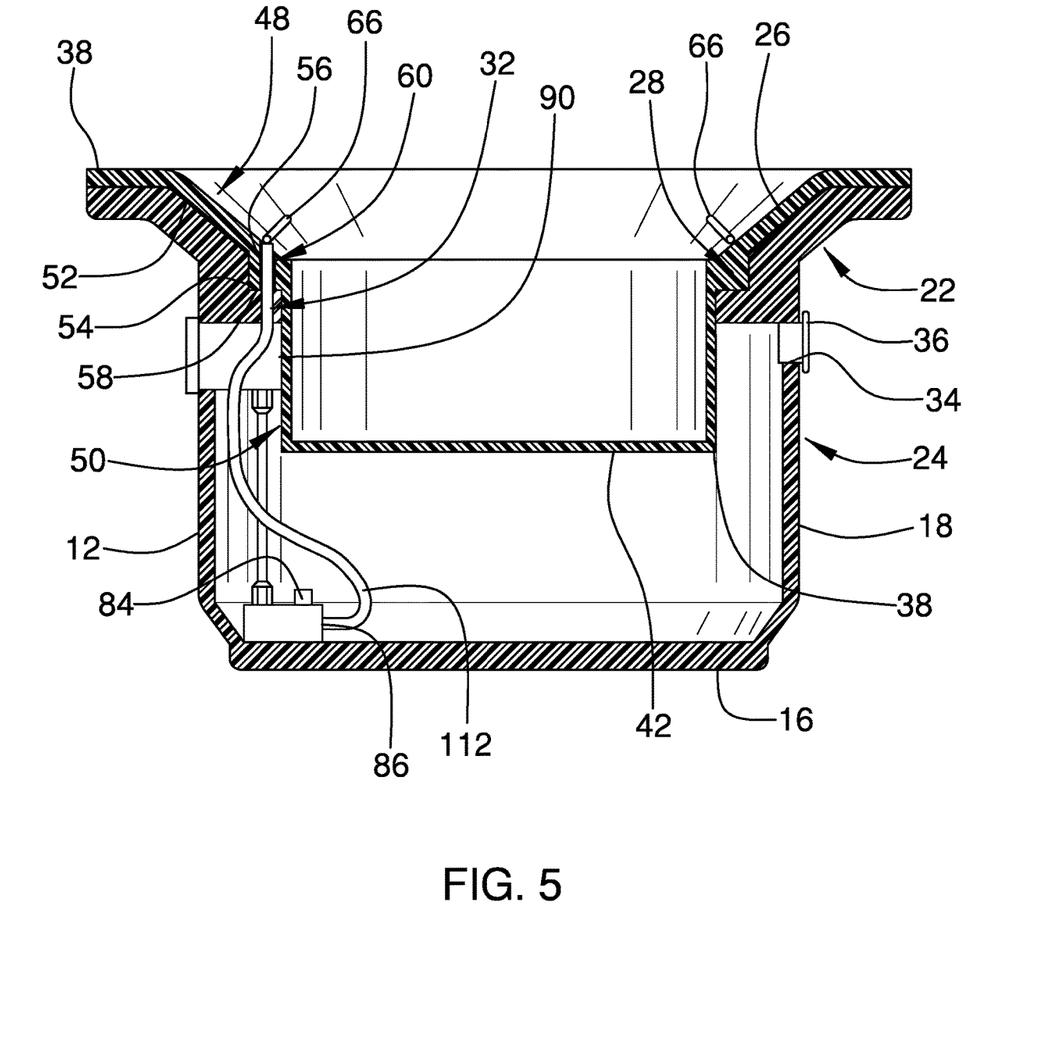
FIG. 5 is a cross sectional view taken along line 5-5 of FIG. 3 of an embodiment of the disclosure.
Figure 6:
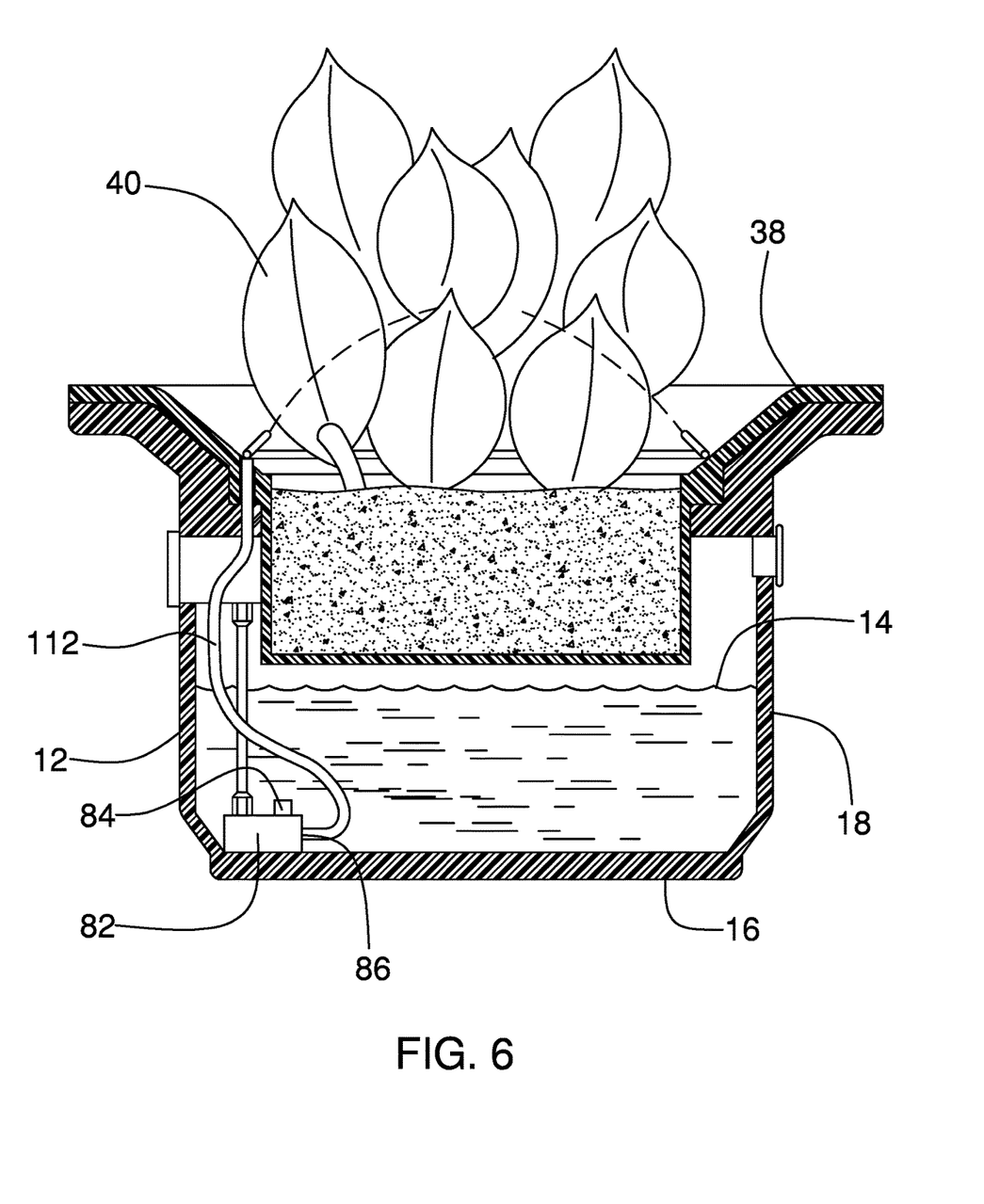
FIG. 6 is a cross sectional in-use view taken along line 5-5 of FIG. 3 of an embodiment of the disclosure.
Figure 7:
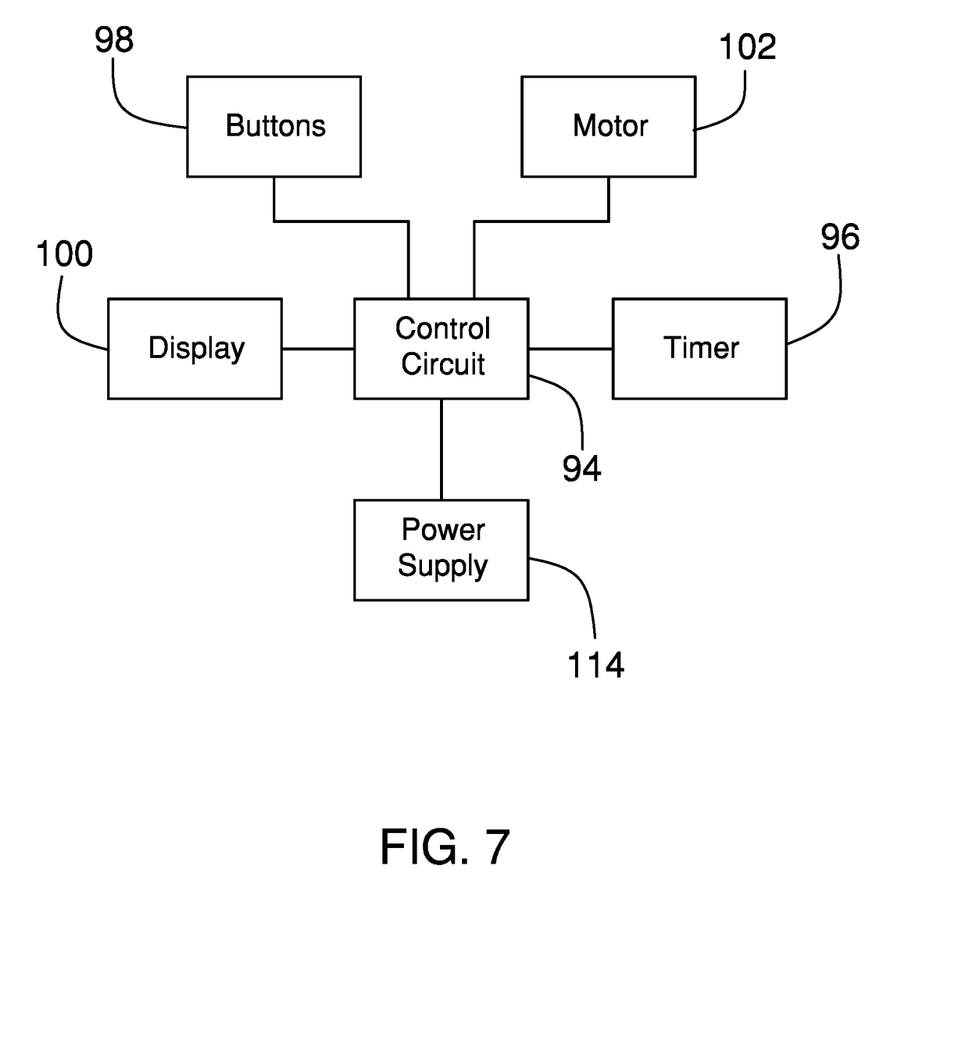
FIG. 7 is a schematic view of an embodiment of the disclosure.

With reference now to the drawings, and in particular to FIGS. 1 through 7 thereof, a new automated pot device embodying the principles and concepts of an embodiment of the disclosure and generally designated by the reference numeral 10 will be described.

As best illustrated in FIGS. 1 through 7, the automated plant pot assembly 10 generally comprises a first pot 12 for containing an aqueous solution 14. The aqueous solution 14 may be water, water and a liquid fertilizer or any other aqueous solution that is used to irrigate plants. The first pot 12 has a bottom wall 16 and an outer wall 18 extending upwardly therefrom, and the outer wall 18 has a distal edge 20 with respect to the bottom wall 16. The outer wall 18 has an upper portion 22 flaring outwardly from a lower portion 24, and the distal edge 20 is associated with the upper portion 22. The upper portion 22 has a thickness that is greater than the thickness of the lower portion 24.

The upper portion 22 has an inside surface 26 and the inside surface 26 has a groove 28 integrated therein. The groove 28 has a lower bounding surface 30 and the lower bounding surface 30 lies on a horizontal plane. Moreover, the groove 28 is positioned adjacent to an intersection between the upper portion 22 and the lower portion 24, and the groove 28 extends around an entire circumference of the upper portion 22.

The upper portion 22 has an aperture 32 extending therethrough and the aperture 32 extends through the lower bounding surface 30 of the groove 28. The outer wall 18 has a drain opening 34 extending therethrough to drain the aqueous solution 14 from the first pot 12. A plug 36 is insertable into the drain opening 34 in the outer wall 18 of the first pot 12 to inhibit the aqueous solution 14 from draining from the first pot 12.

A second pot 38 is provided for having a plant 40 potted therein and the second pot 38 is insertable into the first pot 12. The second pot 38 has a basal wall 42 and a perimeter wall 44 extending upwardly therefrom, and the perimeter wall 44 has a distal edge 46 with respect to the basal wall 42. The perimeter wall 44 has a top portion 48 flaring outwardly from a bottom portion 50 and the distal edge 46 of the perimeter wall 44 is associated with the top portion 48. The top portion 48 has an outer surface 52 and the outer surface 52 has a ridge 54 extending outwardly therefrom.

The ridge 54 has a top surface 56 and a bottom surface 58, and the bottom surface 58 lies on a horizontal plane. The ridge 54 is positioned adjacent to an intersection between the top portion 48 and the bottom portion 50, and the ridge 54 extends around a full circumference of the top portion 48. Moreover, the bottom surface 58 rests on the lower bounding surface 30 of the groove 28 in the upper portion 22 of the first pot 12 when the second pot 38 is positioned in the first pot 12 having the basal wall 42 of the second pot 38 being spaced from the bottom wall 16 of the first pot 12.

The top portion 48 has an aperture 60 extending therethrough and the aperture 60 in the top portion 48 extends through the ridge 54. The aperture 32 in the upper portion 22 of the first pot 12 is aligned with the aperture 60 in the top portion 48 of the second pot 38 when the second pot 38 is positioned in the first pot 12. Additionally, the top surface 56 of the ridge 54 has a slot 62 extending downwardly therein and the slot 62 extends around a full circumference of the top portion 48.

A spray bar 64 is provided and the spray bar 64 is removably positionable in the second pot 38. The spray bar 64 has a plurality of spray ports 66 each being fluidly integrated therein. The spray bar 64 comprises a plurality of tubes 68 that each of has a first end 70 and a second end 72. Additionally, each of the tubes 68 is curved between the first end 70 and the second end 72.

The spray bar 64 includes a plurality of tee fittings 74 that each includes a pair of inlets 76 and an outlet 78 that is in fluid communication with each of the inlets 76. The outlet 78 on each of the tee fittings 74 defines the spray ports 66 on the spray bar 64. Each of the tee fittings 74 is structured such that the outlet 78 on a respective tee fitting 74 has a direction of flow extending along a line that is oriented perpendicular to a direction of flow with respect to each of the inlets 76 of the respective tee fitting 74. Each of the inlets 76 is fluidly attachable to a respective one of the first end 70 and the second end 72 of a respective one of the tubes 68 such that the plurality of tubes 68 and the plurality of tee fittings 74 form a ring that is positionable in the slot 62 in the top surface 56 of the ridge 54 on the second pot 38. Additionally, the outlet 78 on each of the tee fittings 74 is directed toward a center of the ring when the tee fittings 74 are coupled to the tubes 68.

A pumping unit 80 is integrated into the first pot 12 for pumping the aqueous solution 14 in the first pot 12. The pumping unit 80 is placed in fluid communication with the spray bar 64 when the second pot 38 is positioned in the first pot 12. In this way the spray bar 64 can spray the aqueous solution 14 onto the plant 40 that is potted in the second pot 38. The pumping unit 80 is actuated a pre-determined times to pump 82 a pre-determined volume of the aqueous solution 14. In this way the pumping unit 80 can automatically water the plant 40 over an extended duration of time.

The pumping unit 80 comprises a pump 82 that has an intake 84 and an exhaust 86. The pump 82 is positioned in the first pot 12 for pumping the aqueous solution 14 inwardly through the intake 84 and outwardly through the exhaust 86. The pump 82 has a drive input 88 and the pump 82 may comprise a mechanical fluid pump or the like. The pumping unit 80 includes a control box 90 that is integrated into the outer wall 18 of the first pot 12. The control box 90 has a forward wall 92 that is exposed with respect to the outer wall 18 such that the forward wall 92 is accessible to a user.

The pumping unit 80 includes a control circuit 94 that is positioned in the control box 90 and the control circuit 94 receives an on input and an off input. The pumping unit 80 includes a timer 96 that is positioned in the control box 90. The timer 96 is electrically coupled to the control circuit 94 and the timer 96 performs a plurality of activation sequences. The pumping unit 80 includes a plurality of buttons 98 that is each movably coupled to the forward wall 92 of the control box 90. Each of the buttons 98 is electrically coupled to the control circuit 94 and each of the buttons 98 controls operational parameters of the timer 96. The operational parameters include a duration of time between the plurality of activation sequences and an operational duration of each of the activation sequences. Moreover, the control circuit 94 receives the on input when any of the activation sequences begins and the control circuit 94 receives the off input when any of the activation sequences ends.

The pumping unit 80 includes a display 100 that is coupled to the forward wall 92 of the control box 90 such that the display 100 is accessible to the user. The display 100 is electrically coupled to the control circuit 94 and the display 100 displays indicia comprising words and numbers communicating the duration of time between the activation sequences and the duration of time for operation of each activation sequence. The display 100 may comprise an LED or other type of electronic display.

The pumping unit 80 includes a motor 102 that is positioned within the control box 90, the motor 102 is electrically coupled to the control circuit 94 and the motor 102 may comprise an electric motor or the like. The motor 102 is turned on when the control circuit 94 receives the on input and the motor 102 is turned off when the control circuit 94 receives the off input. Additionally, the motor 102 includes a drive output 104 extending outwardly through the control box 90. The pumping unit 80 includes a drive shaft 106 that has a primary end 108 and a secondary end 110. The primary end 108 engages the drive output 104 on the motor 102 and the secondary end 110 engages the drive input 88 on the pump 82. In this way the motor 102 drives the pump 82 when the motor 102 is turned on for pumping the aqueous solution 14 through the spray bar 64 when the motor 102 is turned on.

The pumping unit 80 includes a supply hose 112 that is fluidly coupled between the exhaust 86 of the pump 82 and the spray bar 64 to deliver the aqueous solution 14 to the spray bar 64. The supply hose 112 is routed through the aperture 32 associated with the first pot 12 and the aperture 60 associated with the second pot 38. The pumping unit 80 includes a power supply 114 that is positioned in the control box 90, the power supply 114 is electrically coupled to the control circuit 94 and the power supply 114 comprises at least one battery.

In use, the first pot 12 is filled with the aqueous solution 14 and the second pot 38 is positioned in the first pot 12. The spray bar 64 is attached to the supply hose 112 and the buttons 98 are manipulated to program the timer 96. Thus, the pump 82 is automatically turned on the water the plant 40 for a pre-determined duration of time at pre-determined intervals of time. In this way the plant 40 can be automatically watered over an extended duration of time. Additionally, the first pot 12 can be continuously refilled as necessary.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An automated plant pot assembly for automatically watering a plant contained therein, said assembly comprising:
   a first pot being configured to contain an aqueous solution, said first pot having a bottom wall and an outer wall extending upwardly therefrom, said outer wall having a distal edge with respect to said bottom wall, said outer wall having an upper portion flaring outwardly from a lower portion, said distal edge being associated with said upper portion, said upper portion having a thickness being greater than a thickness of said lower portion, wherein said upper portion has an inside surface, said inside surface having a groove being integrated therein, said groove having a lower bounding surface, said lower bounding surface lying on a horizontal plane, said groove being positioned adjacent to an intersection between said upper portion and said lower portion, said groove extending around an entire circumference of said upper portion, wherein said upper portion has an aperture extending therethrough, said aperture extending through said lower bounding surface of said groove;
   a second pot being configured to have a plant potted therein, said second pot being insertable into said first pot, wherein said second pot has a basal wall and a perimeter wall extending upwardly therefrom, said perimeter wall having a distal edge with respect to said basal wall, said perimeter wall having a top portion flaring outwardly from a bottom portion, said distal edge of said perimeter wall being associated with said top portion, said top portion has an aperture extending therethrough, said aperture in said top portion extending through a ridge, said aperture in said upper portion of said first pot being aligned with said aperture in said top portion of said second pot when said second pot is positioned in said first pot;
   a spray bar being removably positionable in said second pot, said spray bar having a plurality of spray ports each being fluidly integrated therein; and
   a pumping unit being integrated into said first pot, wherein said pumping unit is configured to pump the aqueous solution in said first pot, said pumping unit being placed in fluid communication with said spray bar when said second pot is positioned in said first pot, wherein each of said spray ports on said spray bar is configured to spray the aqueous solution onto the plant that is potted in said second pot, said pumping unit being actuated a pre-determined number of times to pump a pre-determined volume, wherein said pumping unit is configured to automatically water the plant over an extended duration of time, wherein said pumping unit includes:
   a motor being positioned within a control box, said motor being electrically coupled to a control circuit, said motor being turned on when said control circuit receives an on input, said motor being turned off when said control circuit receives an off input, said motor including a drive output extending outwardly through said control box;
   a pump having an intake and an exhaust, said pump being positioned in said first pot, wherein said pump is configured to pump the aqueous solution inwardly through said intake and outwardly through said exhaust, said pump having a drive input being in mechanical communication with said drive output;
   a drive shaft having a primary end and a secondary end, said primary end engaging said drive output on said motor, said secondary end engaging said drive input on said pump such that said motor drives said pump when said motor is turned on, wherein said pump is configured to pump aqueous solution through said spray bar when said motor is turned on; and
   a supply hose being fluidly coupled between said exhaust of said pump and said spray bar, wherein said supply hose is configured to deliver the aqueous solution to said spray bar, said supply hose being routed through said aperture in said first pot and said aperture in said second pot.

2. The assembly according to claim 1, wherein;
   said outer wall has a drain opening extending therethrough, wherein said drain opening is configured to drain the aqueous solution from said first pot; and
   said assembly includes a plug being insertable into said drain opening in said outer wall of said first pot, wherein said plug is configured to inhibit the aqueous solution from draining from said first pot.

3. The assembly according to claim 1, wherein:
   said top portion of said second pot has an outer surface, said outer surface having said, ridge extending outwardly therefrom, said ridge having a top surface and a bottom surface, said bottom surface lying on a horizontal plane, said ridge being positioned adjacent to an intersection between said top portion and said bottom portion, said ridge extending around a full circumference of said top portion, said bottom surface resting on said lower bounding surface of said groove in said upper portion of said first pot when said second pot is positioned in said first pot having said basal wall of said second pot being spaced from said bottom wall of said first pot.

4. The assembly according to claim 3, wherein said top surface of said ridge has a slot extending downwardly therein.

5. The assembly according to claim 4, wherein said spray bar comprises a plurality of tubes, each of said tubes having a first end and a second end, each of said tubes being curved between said first end and said second end.

6. The assembly according to claim 5, wherein said spray bar includes a plurality of tee fittings, each of said tee fittings having a pair of inlets and an outlet being in fluid communication with each of said inlets, each of said tee fittings being structured such that said outlet on a respective tee fitting has a direction of flow extending along a line being oriented perpendicular to a direction of flow with respect to each of said inlets of said respective tee fitting.

7. The assembly according to claim 6, wherein each of said inlets is fluidly attachable to a respective one of said first end and said second end of a respective one of said tubes such that said plurality of tubes and said plurality of tee fittings forms a ring being positionable in said slot in said top surface of said ridge on said second pot, said outlet on each of said tee fittings being directed toward a center of said ring when said tee fittings are coupled to said tubes.

8. The assembly according to claim 1, wherein said pumping unit comprises a control box being integrated into the outer wall of said first pot, said control box having a forward wall being exposed with respect to said outer wall, wherein said forward wall is configured to be accessible to a user.

9. An automated plant pot assembly for automatically watering a plant contained therein, said assembly comprising:
   a first pot being configured to contain an aqueous solution, said first pot having a bottom wall and an outer wall extending upwardly therefrom, said outer wall having a distal edge with respect to said bottom wall, said outer wall having an upper portion flaring outwardly from a lower portion, said distal edge being associated with said upper portion, said upper portion having a thickness being greater than a thickness of said lower portion, said upper portion having an inside surface, said inside surface having a groove being integrated therein, said groove having a lower bounding surface, said lower bounding surface lying horizontally, said groove being positioned adjacent to an intersection between said upper portion and said lower portion, said groove extending around an entire circumference of said upper portion, said upper portion having an aperture extending therethrough, said aperture extending through said lower bounding surface of said groove, said outer wall having a drain opening extending therethrough, wherein said drain opening is configured to drain the aqueous solution from said first pot;
   a plug being insertable into said drain opening in said outer wall of said first pot, wherein said plug is configured to inhibit the aqueous solution from draining from said first pot;
   a second pot being configured to have a plant potted therein, said second pot being insertable into said first pot, said second pot having a basal wall and a perimeter wall extending upwardly therefrom, said perimeter wall having a distal edge with respect to said basal wall, said perimeter wall having a top portion flaring outwardly from a bottom portion, said distal edge of said perimeter wall being associated with said top portion, said top portion having an outer surface, said outer surface having a ridge extending outwardly therefrom, said ridge having a top surface and a bottom surface, said bottom surface lying horizontally, said ridge being positioned adjacent to an intersection between said top portion and said bottom portion, said ridge extending around a full circumference of said top portion, said bottom surface resting on said lower bounding surface of said groove in said upper portion of said first pot when said second pot is positioned in said first pot, said basal wall of said second pot being spaced from said bottom wall of said first pot, said top portion having an aperture extending therethrough, said aperture in said top portion extending through said ridge, said aperture in said upper portion of said first pot being aligned with said aperture in said top portion of said second pot when said second pot is positioned in said first pot, said top surface of said ridge having a slot extending downwardly therein;
   a spray bar being removably positionable in said second pot, said spray bar having a plurality of spray ports each being fluidly integrated therein, said spray bar comprising:
      a plurality of tubes, each of said tubes having a first end and a second end, each of said tubes being curved between said first end and said second end; and
      a plurality of tee fittings, each of said tee fittings having a pair of inlets and an outlet being in fluid communication with each of said inlets, said outlet on each of said tee fittings defining said spray ports on said spray bar, each of said tee fittings being structured such that said outlet on a respective tee fitting has a direction of flow extending along a line being oriented perpendicular to a direction of flow with respect to each of said inlets of said respective tee fitting, each of said inlets being fluidly attachable to a respective one of said first end and said second end of a respective one of said tubes such that said plurality of tubes and said plurality of tee fittings forms a ring being positionable in said slot in said top surface of said ridge on said second pot, said outlet on each of said tee fittings being directed toward a center of said ring when said tee fittings are coupled to said tubes; and
   a pumping unit being integrated into said first pot, wherein said pumping unit is configured to pump the aqueous solution in said first pot, said pumping unit being placed in fluid communication with said spray bar when said second pot is positioned in said first pot, wherein each of said spray ports on said spray bar is configured to spray the aqueous solution onto the plant that is potted in said second pot, said pumping unit being actuated a pre-determined number of times to pump a pre-determined volume, wherein said pumping unit is configured to automatically water the plant over an extended duration of time, said pumping unit comprising:
      a pump having an intake and an exhaust, said pump being positioned in said first pot, wherein said pump is configured to pump the aqueous solution inwardly through said intake and outwardly through said exhaust, said pump having a drive input;
      a control box being integrated into said outer wall of said first pot, said control box having a forward wall being exposed with respect to said outer wall, wherein said forward wall is configured to be accessible to a user;
      a control circuit being positioned in said control box, said control circuit receiving an on input and an off input;
      a timer being positioned in said control box, said timer being electrically coupled to said control circuit, said timer performing a plurality of activation sequences;
      a plurality of buttons, each of said buttons being movably coupled to said forward wall of said control box, each of said buttons being electrically coupled to said control circuit, each of said buttons controlling operational parameters of said timer to include a duration of time between said plurality of activation sequences and an operational duration of each of said activation sequences, said control circuit receiving said on input when any of said activation sequences begins, said control circuit receiving said off input when any of said activation sequences ends;

a display being coupled to said forward wall of said control box, wherein said display is configured to be accessible to the user, said display being electrically coupled to said control circuit, said display displaying indicia comprising words and numbers communicating a duration of time between the activation sequences and a duration of time for operation of each of the activation sequences;

a motor being positioned within said control box, said motor being electrically coupled to said control circuit, said motor being turned on when said control circuit receives said on input, said motor being turned off when said control circuit receives said off input, said motor including a drive output extending outwardly through said control box;

a drive shaft having a primary end and a secondary end, said primary end engaging said drive output on said motor, said secondary end engaging said drive input on said pump such that said motor drives said pump when said motor is turned on, wherein said pump is configured to pump aqueous solution through said spray bar when said motor is turned on;

a supply hose being fluidly coupled between said exhaust of said pump and said spray bar, wherein said supply hose is configured to deliver the aqueous solution to said spray bar, said supply hose being routed through said aperture in said first pot and said aperture in said second pot; and a power supply being positioned in said control box, said power supply being electrically coupled to said control circuit, said power supply comprising at least one battery.

* * * * *